(12) United States Patent
Hart et al.

(10) Patent No.: US 12,168,189 B2
(45) Date of Patent: *Dec. 17, 2024

(54) METHOD AND APPARATUS FOR CATCHING SILT

(71) Applicants: David Hart, Uniontown, OH (US); Michael Thompson, Las Vegas, NV (US); Timothy Pierzynski, Apple Creek, OH (US)

(72) Inventors: David Hart, Uniontown, OH (US); Michael Thompson, Las Vegas, NV (US); Timothy Pierzynski, Apple Creek, OH (US)

(*) Notice: Subject to any disclaimer, the term of this patent is extended or adjusted under 35 U.S.C. 154(b) by 376 days.

This patent is subject to a terminal disclaimer.

(21) Appl. No.: 16/733,775

(22) Filed: Jan. 3, 2020

(65) Prior Publication Data

US 2020/0215465 A1 Jul. 9, 2020

Related U.S. Application Data

(60) Provisional application No. 62/917,845, filed on Jan. 4, 2019.

(51) Int. Cl.
*B01D 29/23* (2006.01)
*B01D 35/157* (2006.01)
*F16K 51/00* (2006.01)

(52) U.S. Cl.
CPC ......... *B01D 29/23* (2013.01); *B01D 35/1573* (2013.01); *F16K 51/00* (2013.01); *B01D 2201/301* (2013.01); *B01D 2201/4092* (2013.01); *B01D 2201/52* (2013.01)

(58) Field of Classification Search
CPC ................ B01D 29/23; B01D 35/1573; B01D 2201/4092; B01D 2201/52; B01D 2201/301; B01D 2201/295; B01D 35/02; B01D 29/27; B01D 2201/56; B01D 29/13; B01D 29/31; F16K 51/00; F16K 37/0025; E03F 5/0404; E03F 7/02; G06K 19/0723
USPC .......................................... 210/448, 452, 767
See application file for complete search history.

(56) References Cited

U.S. PATENT DOCUMENTS

| | | | | |
|---|---|---|---|---|
| 3,747,772 A | * | 7/1973 | Brown | B01D 29/012 210/493.1 |
| 4,143,581 A | * | 3/1979 | Smith | F16B 13/061 411/337 |
| 4,419,232 A | * | 12/1983 | Arntyr | E03F 5/0404 210/170.03 |

(Continued)

FOREIGN PATENT DOCUMENTS

| | | | | |
|---|---|---|---|---|
| DE | 102010034515 A1 | * | 2/2011 | ........... B01D 29/906 |
| EP | 1245258 A2 | * | 10/2002 | ............. B01D 29/23 |
| WO | WO-2012150268 A2 | * | 11/2012 | ........... B01D 27/005 |

OTHER PUBLICATIONS https://www.merriam-webster.com/dictionary/handle (Year: 2022).*

*Primary Examiner* — Ekandra S. Miller-Cruz
(74) *Attorney, Agent, or Firm* — Sand, Sebolt & Wernow Co., LPA (57) ABSTRACT

A silt and debris catching apparatus comprises a housing component and a catchment component. The housing component is adapted to fit within a valve box assembly. The catchment component is coupled to the housing component and includes a filter. The filter retains material that enters the valve box assembly.

6 Claims, 6 Drawing Sheets

(56) References Cited

U.S. PATENT DOCUMENTS

| | | | | |
|---|---|---|---|---|
| 4,459,208 A * | 7/1984 | Lemon | ................... | B01D 35/30 |
| | | | | 184/6.12 |
| 8,368,518 B1 | 2/2013 | Castrovinci | | |
| 9,579,597 B2 * | 2/2017 | Gruenbacher | ......... | B01D 46/02 |
| 9,792,792 B2 * | 10/2017 | Strassburger | ...... | G08B 13/2417 |
| 9,982,418 B2 * | 5/2018 | Bennett | ................... | E03B 7/095 |
| 2006/0060512 A1 * | 3/2006 | Astle | ................... | B01D 29/606 |
| | | | | 210/85 |
| 2009/0173397 A1 | 7/2009 | Mallela et al. | | |
| 2012/0145612 A1 * | 6/2012 | McInnis | ................ | E03F 5/0404 |
| | | | | 210/163 |
| 2017/0219110 A1 * | 8/2017 | Kennedy | ................ | F16K 17/12 |

\* cited by examiner

METHOD AND APPARATUS FOR CATCHING SILT

CROSS REFERENCE TO RELATED APPLICATIONS

This application claims the benefit of U.S. Non-Provisional Application Ser. No. 62/917,845, filed on Jan. 4, 2019; the disclosure of which is incorporated herein by reference.

TECHNICAL FIELD

The following generally relates to valve box assemblies. More specifically, the following relates to an apparatus that prevents material from covering a valve located within a valve box assembly, specifically the following relates to a method and apparatus for catching silt and debris in a valve body riser.

BACKGROUND

Background Information

Miles of distribution pipes may carry water and gas from an origination location to several different destinations. Typically, control valves are placed at different intervals along the pipes and below the surface to control the flow of water or gas within the pipes. In the event of pipe breakage or normal pipe maintenance, it is necessary to access the control valves to prevent the flow of water or gas into certain sections of pipe. These valves are placed in valve boxes or valve body risers. The valve boxes are tubular castings that extend from the surface to the pipe and include a surface opening for access to the valve. The surface opening of a valve box is covered with a loosely fitted cover. When it is necessary to access and turn on or off a control valve, the cover may be removed and a valve wrench is inserted into the valve box. The valve wrench couples to the control valve and a user rotates the valve wrench thereby opening or closing the control valve.

Unfortunately, water containing silt or debris may flow into the space around box cover and enter the valve box. As a result, silt or debris is deposited within the valve box and may cover a control valve thereby preventing access to the control valve. Furthermore, control valves are often located under road surfaces. When a road is being repaved, covers are removed while the existing asphalt is removed. During this process, debris may enter the valve box further covering the control valve.

Special tools are needed to remove the silt and debris from the valve box. This process is time consuming and manually difficult. This problem is further exacerbated when a pipe breaks thereby creating a high flow of water or gas over the control valve. In the case of pipe breakage, accessing the control valve is critical and delays caused by inaccessible valves increase problems associated with fixing a pipe break.

SUMMARY

In one aspect, an exemplary embodiment of the present disclosure may provide a silt and debris catching apparatus comprising: a housing component adapted to fit within a valve box assembly; and a catchment component comprising a filter, wherein the catchment component is coupled to the housing component and wherein the filter is adapted to retain material that enters the valve box assembly.

In another aspect, an exemplary embodiment of the present disclosure may provide a method for catching material that enters a valve box assembly comprising: placing a material catching apparatus within the valve box assembly; and selectively retaining material that enters the valve box assembly with the material catching apparatus.

In another aspect, and exemplary embodiment of the present disclosure may provide a method for locating a valve box assembly comprising: locating a radio-frequency identification whip within the valve box assembly.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

FIGS. 1-5 depict a silt and debris catching apparatus 100 that interfaces with a valve box assembly or a valve body riser 102. When the silt and debris catching apparatus 100 interfaces with the valve box assembly 102, the silt and debris catching apparatus 100 may retain material that enters the valve box assembly 102.

Figure 2:
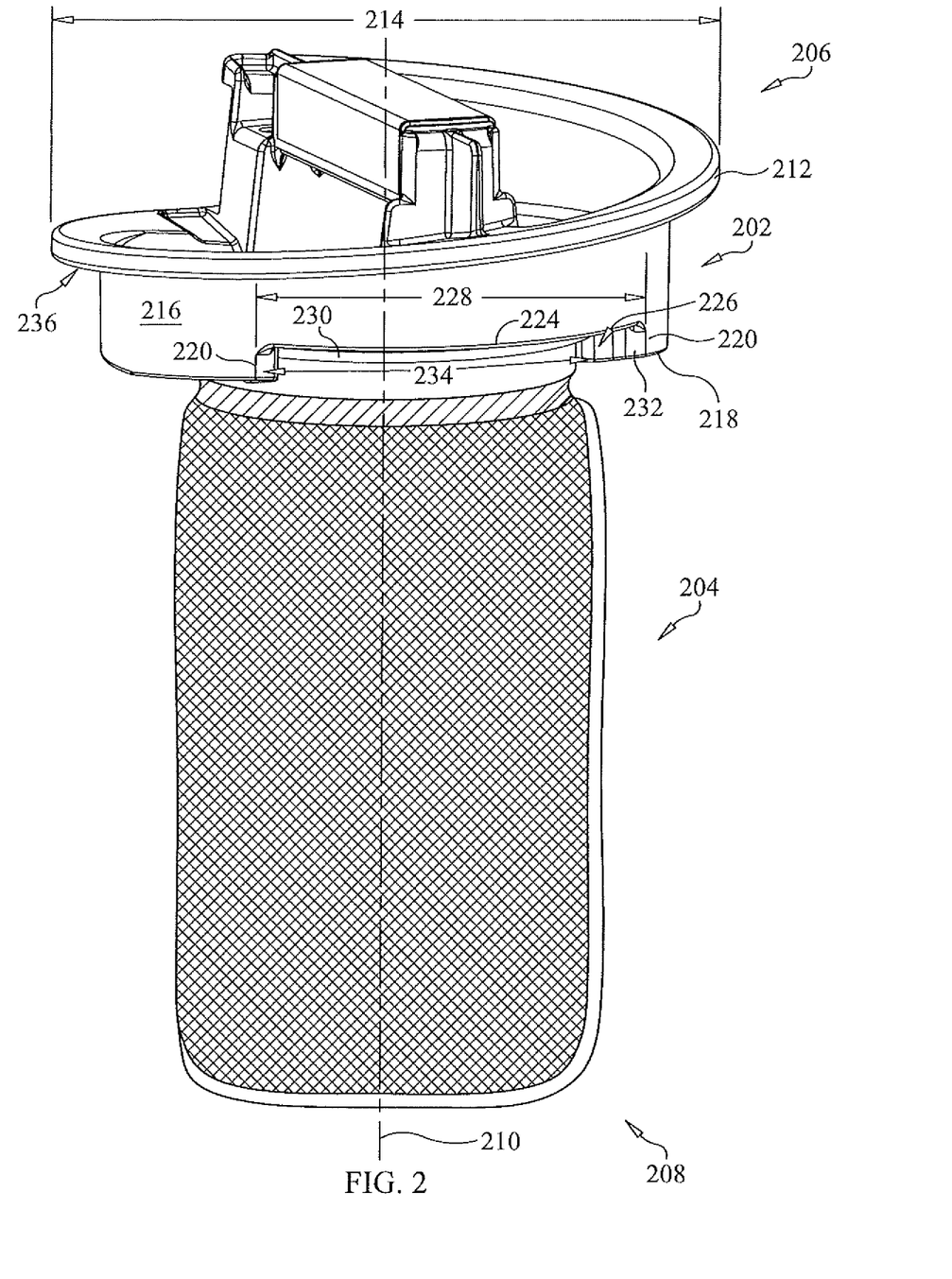
FIG. 2 is a view of a silt and debris catching apparatus in accordance with an exemplary embodiment of the present disclosure.

As depicted in FIG. 2, the silt and debris catching apparatus 100 comprises a housing component 202, a catchment component 204, a first end 206, a second end 208 opposite the first end 206, and a longitudinal axis 210 between the first end 206 and the second end 208. Some portions of the silt and debris catching apparatus 100 will be described relative to the longitudinal axis 210 and may be used in conjunction with the terms circumferential, or radial, relative to the longitudinal axis 210.

As further depicted in FIG. 2, the housing component 202 includes a first outer wall 212 that is generally parallel to the longitudinal axis 210. The first outer wall 212 is the radial outermost portion of the silt and debris catching apparatus 100. As such, the silt and debris catching apparatus 100 has a diameter 214 measured between opposing first outer walls 212 through the longitudinal axis 210. The housing component 202 further comprises a second outer wall 216. The second outer wall 216 extends longitudinally to a lower edge 218 of the housing component 202. The second outer wall 216 extends circumferentially to and generally parallel to the longitudinal axis 210.

A first inlet wall 220 and a second inlet wall 222 extend longitudinally from the lower edge 218 to an upper edge 224. The first inlet wall 220, the second inlet wall 222, and the upper edge 224 define an inlet 226 adapted to receive the catchment component 204. The inlet 226 has an outer width 228 measured between the first inlet wall 220 and the second inlet wall 222 through the longitudinal axis 210. A first rounded wall 230 and a second rounded wall 232 extends radially inward from the first inlet wall 220 and the second inlet wall 222 respectively. The inlet 226 has an inner width 234 measured between the first rounded wall 230 and the second rounded wall 232. The inner width 234 is slightly less than the outer width 228. The housing component 202 further comprises a rounded surface 236. As will be discussed in further detail below, when the silt and debris catching apparatus 100 is installed in the valve box assembly 102, the rounded surface 236 rests upon the thread 106.

Figure 1:
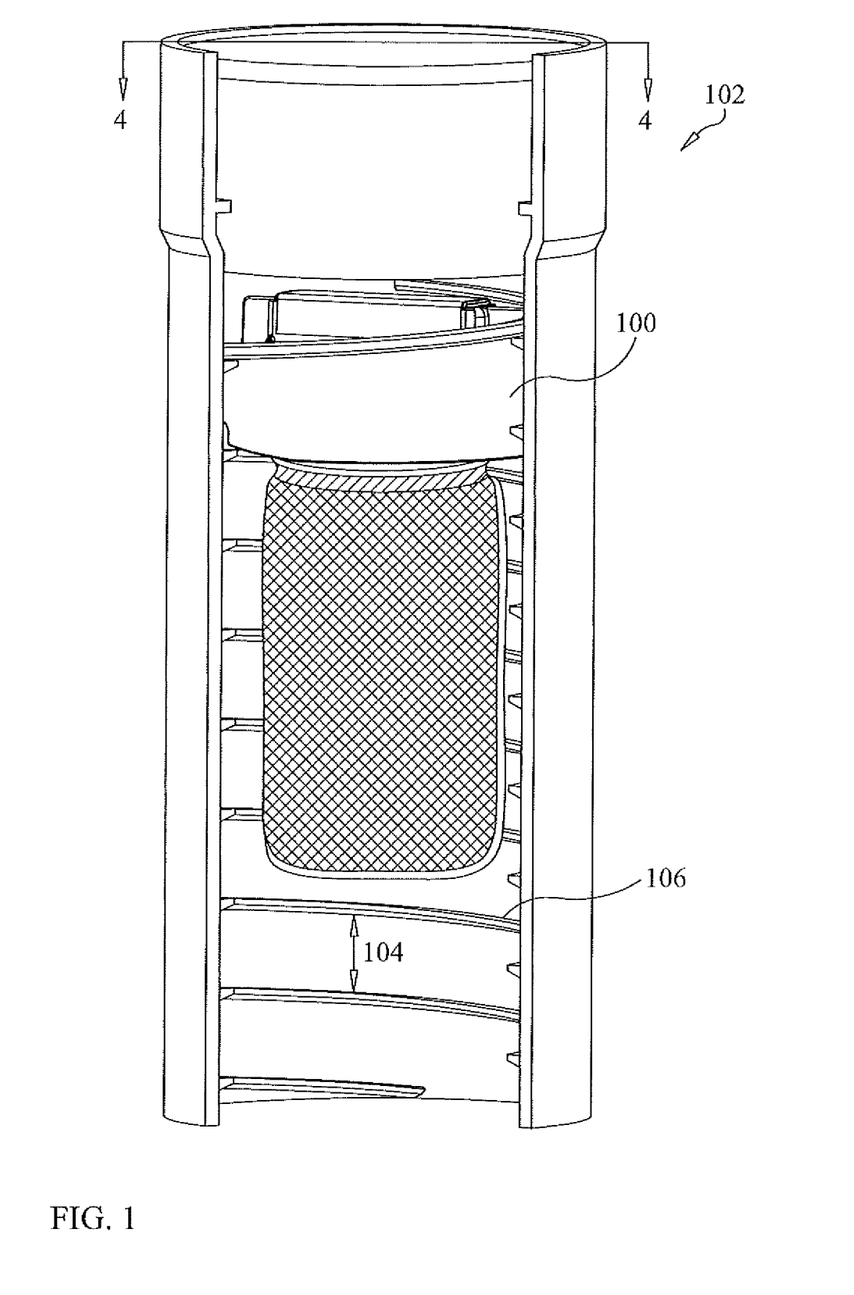
FIG. 1 is an operational view depicting a valve box assembly with a silt and debris apparatus.
Figure 3:
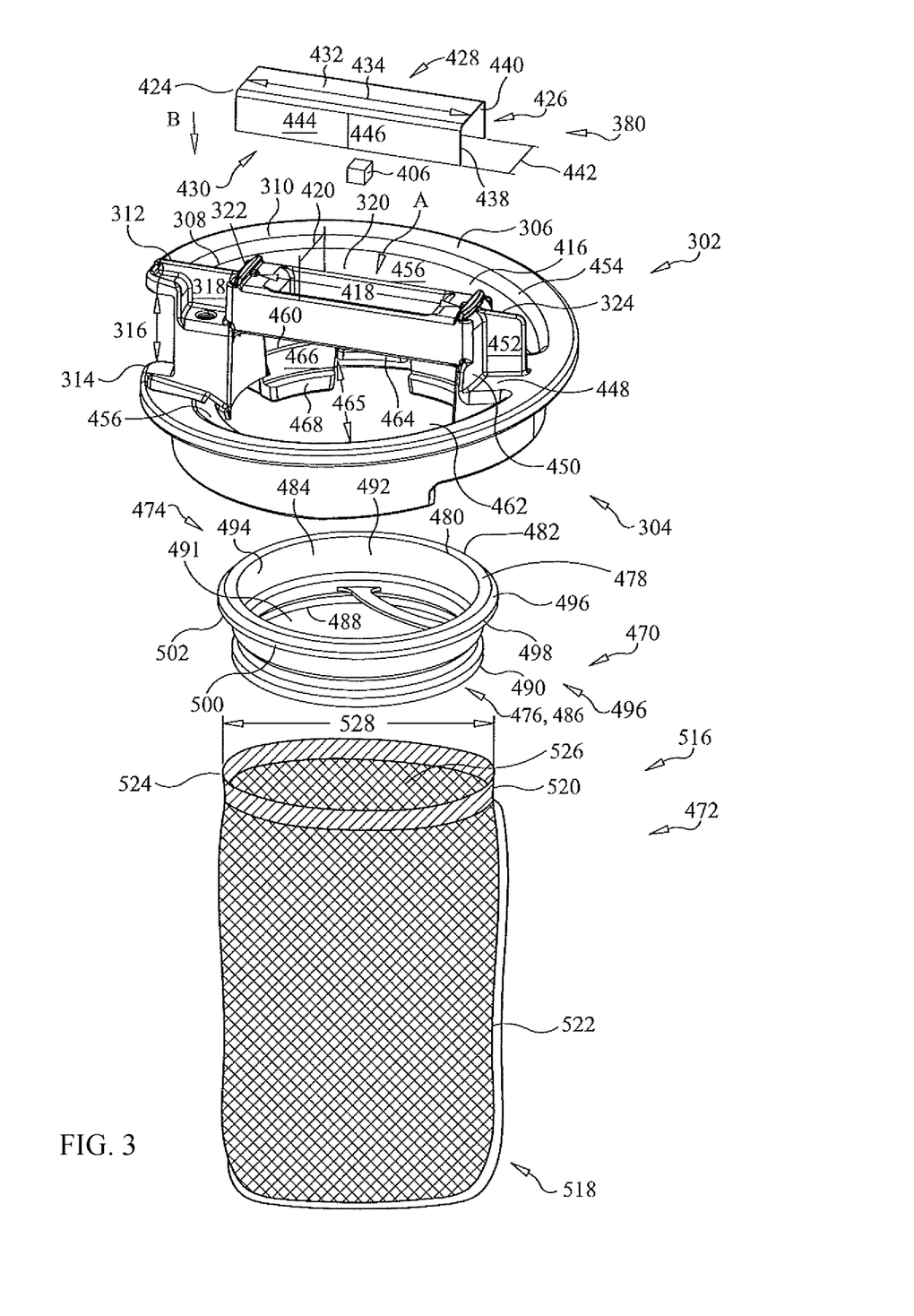
FIG. 3 is an exploded view of the silt and debris catching apparatus depicted in FIG. 2.

As depicted in FIG. 3, the housing component 202 comprises a first end 302, a second end 304 opposite the first end 302. The longitudinal axis 210 extends between the first end 302 and the second end 304. The housing component 202 comprises a thread follower or helix surface 306. The helix surface 306 is defined by a first inner edge 308, a first outer edge 310, a first terminal end 312 and a second terminal end 314. The helix surface 306 extends around and generally perpendicular to the longitudinal axis 210. In one embodiment, the helix surface 306 extends approximately 360° around the longitudinal axis 210. It is envisioned that in other embodiments the helix surface 306 may extend more or less than 360° around the longitudinal axis 210. The helix surface 306 slopes radially inward towards the longitudinal axis 210. The slope of the helix surface 306 directs material (i.e., water, silt, debris, etc.) towards a center of the silt and debris catching apparatus 100 along directional arrow A. As will be discussed in further detail below, the helix surface 306 has a pitch 316 that corresponds to a pitch 104 of a thread 106 of the valve box assembly 102 (FIG. 1).

A first wall 318 defines the first terminal end 312 of the helix surface 306. The first wall 318 extends radially inward from the first outer edge 310 to a handle 320. The handle 320 includes a first side 322 and a second side 324 opposite the first side 322 that is structurally identical to the first side 322. Accordingly, for brevity, similar reference numerals on the first side 322 of the handle 320 refer to similar elements on the second side 324 and vice versa.

Figure 3A:
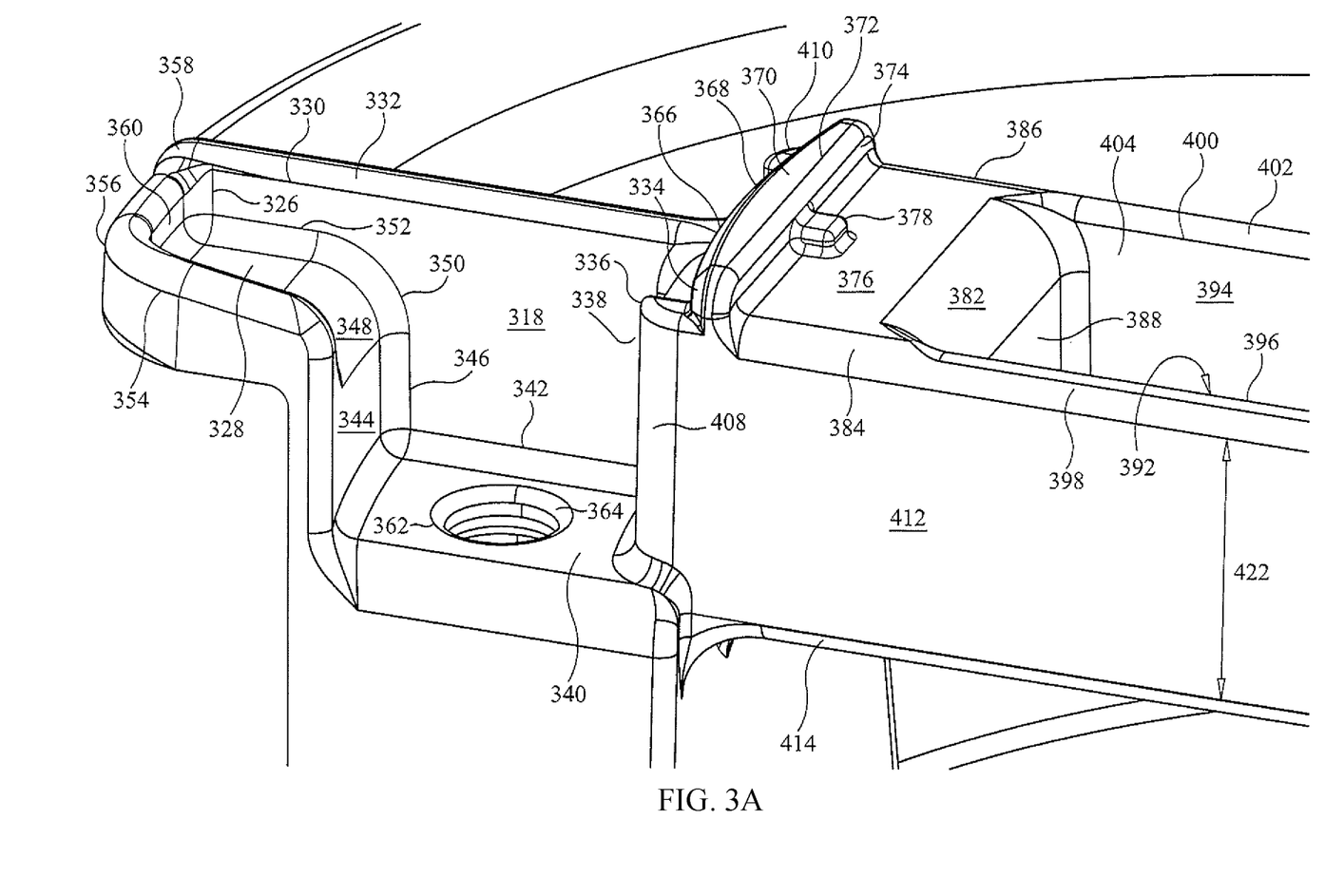
FIG. 3A is an enlarged view of a portion of the silt and debris catching apparatus depicted in FIG. 3.

As depicted in FIG. 3A, a first vertical terminal end 326 of the first wall 318 extends longitudinally from a first surface 328 to a first edge 330 of a second surface 332. The first edge 330 extends radially inward from the first outer edge 310 of the helix surface 306 to a curved portion 334 of a second wall 336 of the handle 320. A second vertical terminal end 338 of the first wall 318 extends longitudinally from the first edge 330 to a third surface 340. A first horizontal terminal end 342 of the first wall 318 extends radially outward from the second wall 336 to a third wall 344. A third vertical terminal end 346 of the first wall 318 extends longitudinally from the third surface 340 to a first curved wall 348. A curved end 350 of the first wall 318 convexly curves radially outward from the third vertical terminal end 346 to a second horizontal terminal end 352. The second horizontal terminal end 352 extends radially outward from the first curved wall 348 to the first outer edge 310 of the helix surface 306.

The second wall 336 and the third wall 344 extend longitudinally and generally parallel to the longitudinal axis 210. The first surface 328, the second surface 332, and the third surface 340, extend radially and generally perpendicular to the longitudinal axis 210.

A fourth surface 354 is defined by a second outer edge 356 and a second inner edge 358. The fourth surface 354 extends perpendicular from the first wall 318 and convexly curves approximately 90° to the third wall 344. A fourth wall 360 extends longitudinally from the second inner edge 358 to the first surface 328. The first surface 328 extends radially inward from the fourth wall 360 to the first curved wall 348. The first surface 328 also extends between the fourth wall 360 and the first wall 318. The first curved wall 348 convexly curves radially inward and downward from the first surface 328 to the third wall 344. The third wall 344 extends longitudinally from the first curved wall 348 to the third surface 340.

The third surface 340 extends radially inward from the third wall 344 to the second wall 336. The third surface 340 also extends between the first wall 318 and the second outer edge 356. A surface (not shown) that is structurally identical to the third surface 340 exists on an opposing side of the first wall 318. The third surface 340 includes an annular edge 362. The annular edge 362 defines a removable knockout plug 364. The knockout plug 364 is a molded member of the housing component 202 that may be removed by applying a force parallel to the longitudinal axis 210. When removed, the annular edge 362 defines a first opening of a bore. The bore extends from the first opening to a second opening on a surface that opposes third surface 340. The bore is adapted to accommodate a tracer wire that is coupled to a pipe located at a bottom of a valve box. The tracer wire may extend from a pipe through the bore and to the surface where it is accessible to a user.

The second wall 336 of the handle 320 extends longitudinally from the third surface 340. The curved portion 334 of the second wall 336 convexly curves radially inward to a second curved wall 366. The second curved wall 366 extends longitudinally from the curved portion 334 of the second wall 336 to a curved edge 368. A fifth surface 370 extends from the curved edge 368 to an edge 372. A fifth wall 374 extends longitudinally from the edge 372 to a sixth surface 376. A locking notch 378 extends longitudinally from the sixth surface 376 and extends radially inward from the fifth wall 374. As will be discussed in further detail below, the locking notch 378 receives a complementary portion of a cover 380 (FIG. 3) thereby securing the cover 380 to the housing component 202.

Figure 4:
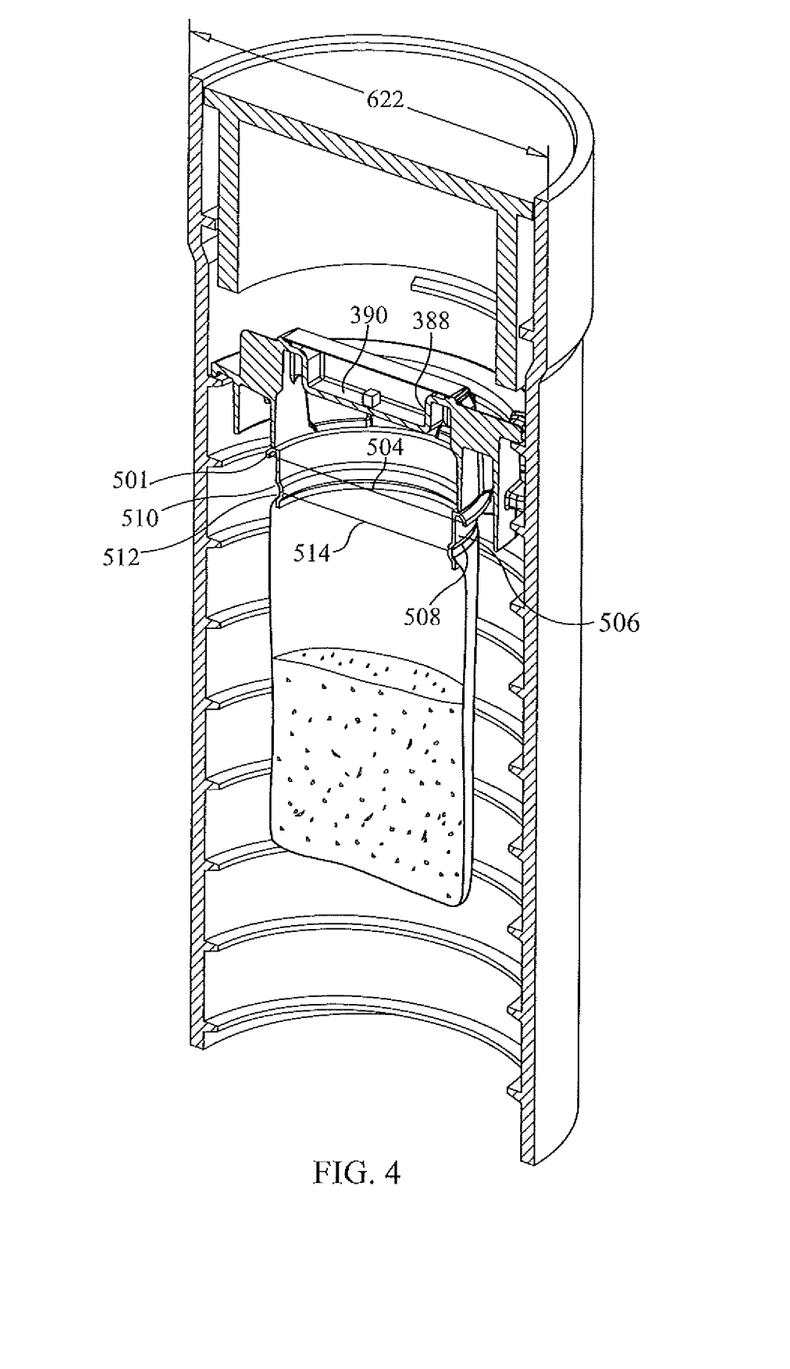
FIG. 4 is a longitudinal cross section view of the valve box with the silt and debris catching apparatus depicted in FIG. 1 taken along the line 4-4 in FIG. 1.

The sixth surface 376 extends radially inward from the fifth wall 374 to a curved edge 382. The sixth surface 376 further extends between a first outer rounded edge 384 and a second outer rounded edge 386. The curved edge 382 curves downward and radially inward from the sixth surface 376 to a seventh wall 388. As depicted in FIG. 4, the seventh wall 388 extends longitudinally from the curved edge 382 to an inner surface 390. The inner surface 390 extends radially inward from the seventh wall 388 to an opposing seventh wall 388. Returning to FIG. 3A, the curved edge 382 and the seventh wall 388 extend between a first inner wall 392 and a second inner wall 394. The first inner wall 392 extends longitudinally from the inner surface 390 to an edge 396 of a seventh surface 398. The second inner wall 394 extends longitudinally from the inner surface 390 to an edge 400 of an eighth surface 402.

Opposing curved edges 382, opposing seventh walls 388, the inner surface 390, the first inner wall 392 and the second inner wall 394 define a channel 404. The channel 404 may be appropriately dimensioned so as to accommodate a radio-frequency identification (RFID) chip 406 (FIG. 3) within the channel. The RFID chip 406 may be placed within the channel 404 and secured within the channel 404 by the cover 380. The RFID chip 406 emits a unique radio frequency that may be read by an RFID chip reader when the reader is within a predetermined range from the RFID chip 406. As such, when the housing component 202 and the RFID chip 406 are within the valve box assembly 102, a user may locate the valve box assembly 102 by determining an RFID chip reader is within range of the RFID chip 406. Furthermore, the chip reader may store data associated with the RFID chip 406 (i.e., when the valve was last accessed, how often the valve has been accessed within a given time period, etc.).

With continued reference to FIG. 3A, the second wall 336 further extends perpendicular from the first wall 318 to a first rounded corner 408 and a second rounded corner 410. The first rounded corner 408 convexly curves approximately 90° about the longitudinal axis 210 to a sixth wall 412 and the second rounded corner 410 convexly curves approximately 90° about the longitudinal axis 210 to an opposing wall (not shown). The opposing wall is structurally identical to the sixth wall 412. The sixth wall 412 extends longitudinally between the first outer rounded edge 384 and an edge 414. The sixth wall 412 further extends between opposing first rounded corners 408 and the opposing wall extends between opposing second rounded corners 410.

As depicted in FIG. 3, opposing second walls 336, opposing first rounded corners 408 and opposing second rounded corners 410, and opposing sixth walls 412, define an outer surface 416 of the handle 320. A length 418 of the handle 320 is measured between opposing fifth walls 374 through the longitudinal axis 210. A width 420 of the handle 320 is measured between the sixth wall 412 and the opposing wall through the longitudinal axis 210. A height 422 of the handle 320 is measured between the first outer rounded edge 384 and the edge 414 and parallel to the longitudinal axis 210 (FIG. 3A).

With continued reference to FIG. 3, the cover 380 comprises a first horizontal end 424, a second horizontal end 426 opposite the first horizontal end 424, a first vertical end 428, and a second vertical end 430 opposite the first vertical end 428.

The cover 380 further comprises a first surface 432. The first surface 432 has a length 434 measured between the first horizontal end 424 and the second horizontal end 426 through the longitudinal axis 210. The length 434 is generally complementary to the length 418 of the handle 320. The cover 380 further comprises a second surface 436 that opposes the first surface 432. A first inner surface 438 and a second inner surface 440 extend longitudinally from the second surface 436. The cover 380 has a width 442 measured between the first inner surface 438 and the second inner surface 440. The width 442 is generally complementary to the width 420 of the handle 320. The surface comprises a notch receiving component (not shown) that is generally complementary to and adapted to receive the locking notch 378. The cover 380 further comprises a first outer surface 444 that opposes the first inner surface 438. The first outer surface 444 extends longitudinally from the first surface 432, and therefore the first vertical end 428, to the second vertical end 430. The first outer surface 444 has a height 446 measured between the first vertical end 428 and the second vertical end 430. The height 446 is generally complementary to the height 422 of the handle 320.

When a downward force is applied along the directional arrow B such that the cover 380 is placed over the handle 320, the notch receiving component of the cover 380 physically couples to the locking notch 378. As shown in FIG. 4, since the first surface 432 has a generally complementary length 434 to the length 418 of the handle 320, the first horizontal end 424 and the second horizontal end 426 abut opposing fifth walls 374. Since the first outer surface 444 has a height 446 that is generally complementary to the height 422 of the handle 320, the second vertical end 430 of the cover 380 does not extend beyond the edge 414 of the handle 320. Stated otherwise, the cover 380 does not extend longitudinally beyond the handle 320. As further depicted in FIG. 4 when the cover 380 is secured into place by the locking notch 378, the second surface 436 rests upon and physically contacts the sixth surface 376 of the handle 320. As a result, when the silt and debris catching apparatus 100 is within the valve box assembly 102 the cover 380 may prevent material (i.e., water, silt, debris, etc.) that may compromise the RFID chip 406 from entering the channel 404. The cover 380 may be release from the locking notch 378 by an upward force opposite the movement arrow B.

A perpendicular portion 448 of the helix surface 306 extends radially inward and perpendicular to the longitudinal axis 210. An opposing second wall 450 extends longitudinally from the perpendicular portion 448. The opposing second wall 450 extends generally parallel to the longitudinal axis 210. An opposing first wall 452 extends radially outward from the opposing second wall 450 and extends longitudinally from the perpendicular portion 448.

A rounded inner edge 454 curves radially inward and downward from the first inner edge 308 to a first inner wall 456. The first inner wall 456 extends longitudinally from the rounded inner edge 454 to an inner sloped surface 458 the inner sloped surface 458 extends radially inward and downward from the first inner wall 456 towards the longitudinal axis 210 to a first inner edge 460. The first inner wall 456 extends generally parallel to the longitudinal axis 210 and generally perpendicular to the helix surface 306. The first inner edge 460 defines an opening 462 of the housing component 202. The opening 462 has a diameter 465 measured between opposing first inner edges 460 and through the longitudinal axis 210. First radially inward extending bosses 464 extend radially inward from the first inner edge 460 toward the longitudinal axis 210. The first radially inward extending bosses 464 are generally equidistantly spaced around the opening 462. A second inner wall 466 extends longitudinally from the first inner edge 460 and is generally parallel to the longitudinal axis 210. Second radially inward extending bosses 468 extend radially form the second inner wall 466. The second radially inward extending bosses 468 are radially offset from the first radially inward extending bosses 464.

In one particular embodiment, the housing component 202 is formed from a uniform, monolithic member formed from a suitably rigid material so as to withstand deformation when the housing component 202 is placed within a valve box assembly 102. The housing component 202 may be fabricated from a polymer material; however other rigid materials are entirely contemplated. Furthermore, the integral structure of the housing component 202 may be formed from multiple elements having similar configurations as one having ordinary skill in the art would understand.

With continued reference to FIG. 3, the catchment component 204 comprises an attachment component 470 and a filtration component 472.

The attachment component 470 comprises a first end 474 and a second end 476 opposite the first end 474. The longitudinal axis 210 between the first end 474 and the second end 476. A first annular surface 478 is defined by a first inner annular edge 480 and a first outer annular edge 482. The first annular surface 478 defines the first end 474. The first annular surface 478 extends circumferentially around and generally perpendicular to the longitudinal axis 210. The first inner annular edge 480 defines a first opening 484. When the attachment component 470 is coupled to the housing component 202, the first opening 484 is in open communication with the opening 462 of the housing component 202.

The attachment component 470 further comprises a second annular surface 486 that defines the second end 476 of the attachment component 470 and extends circumferentially around and generally perpendicular to the longitudinal axis 210. The second annular surface 486 is defined by a second inner annular edge 488 and a second outer annular edge 490. The second inner annular edge 488 defines a second opening 491. An inner surface 492 extends from the first inner annular edge 480 to the second inner annular edge 488. The inner surface 492 extends circumferentially around and generally parallel to the longitudinal axis 210. The first inner annular edge 480, the inner surface 492, and the second inner annular edge 488 define a bore 494.

The attachment component 470 further comprises a third annular surface 496 that extends radially outward from the first outer annular edge 482 to a third outer annular edge 498. The third annular surface 496 extends circumferentially around the longitudinal axis 210 and pitches downward away from the longitudinal axis 210. A first outer wall 500 extends longitudinally from the third annular surface 496 to fourth outer annular edge 502. The first outer wall 500 extends circumferentially around and generally parallel to the longitudinal axis 210. The first outer wall 500 is the radial outermost portion of the attachment component 470. As depicted in FIG. 4, the attachment component 470 has a diameter 504 measured between opposing first outer walls 500 and through the longitudinal axis 210. The diameter 504 is generally complementary to the diameter 465 of the opening 462. Furthermore, the diameter 504 is slightly greater than inner width 234 of the inlet 226. A fourth annular surface 505 extends radially inward from the fourth outer annular edge 502. The fourth annular surface 505 extends circumferentially around and generally perpendicular to the longitudinal axis 210

With continued reference to FIG. 4, the attachment component 470 further comprises an outer surface 506. The outer surface 506 extends circumferentially around and generally parallel to the longitudinal axis 210. The outer surface 506 includes an attachment surface 508 for coupling the filtration component 472 to the attachment component 470. The attachment surface 508 extends longitudinally from a first corner 510 of the outer surface 506 to a second corner 512 of the outer surface 506. The attachment surface 508 has a diameter 514 measured between opposing sides of the attachment surface 508 and through the longitudinal axis 210.

In one particular embodiment, the attachment component 470 is formed from a uniform, monolithic member formed from a non-rigid material. The attachment component 470 may be fabricated from a polymer material; however other materials are entirely contemplated. Furthermore, the integral structure of the attachment component 470 may be formed from multiple elements having similar configurations as one having ordinary skill in the art would understand.

The inlet 226 is adapted to slidably receive the attachment component 470. Since the attachment component has a diameter 504 that is greater than inner width 234 of the inlet 226 and since the attachment component 470 is formed from a non-rigid material whereas the housing component 202 is formed of a rigid material, the first rounded wall 230 and the second rounded 232 wall compress the attachment component 470 when the attachment component 470 is inserted into the inlet 226. As force is applied to the attachment component 470, the rounded walls continue to compress the attachment component 470 until the attachment component 470 completely passes through the inlet 226 and rests within the opening 462. When completely within the opening 462, the attachment component 470 decompresses and returns to its original shape.

When the attachment component 470 is inserted into the housing component 202, the first outer wall 500 of the attachment component 470 contacts the second inner wall 466, the first rounded wall 230 and the second rounded wall 232 of the housing component 202. This contact holds the attachment component 470 horizontally within the housing component 202. Furthermore, the first annular surface 478 of the attachment component 470 contacts the first radially inward extending bosses 464 and the fourth annular surface 505 contacts the second radially inward extending bosses 468 of the housing component 202. This contact holds the attachment component vertically within the housing component 202.

Returning to FIG. 3, the filtration component 472 includes a first end 516, a second end 518, and the longitudinal axis 210 extends between the first end 516 and the second end 518. The second end 518 of the filtration component 472 defines the second end 208 of the silt and debris catching apparatus 100.

The filtration component 472 comprises an annular attachment section 520 and a filtration section 522. In one embodiment, the filtration section 522 is a mesh direct pass-through filter however which selectively retains certain material (i.e., solid material, silt, debris, etc.) while allowing other material (i.e., liquid material, water, etc.) to pass through. Other filters including solid filters or other pass-through filters of different lengths, micron sizes, and materials (i.e., plastic fiber, metal, etc.) are envisioned. The attachment section 520 comprises an annular surface 524. The annular surface 524 extends circumferentially and generally perpendicular to the longitudinal axis 210 and defines an opening 526. The annular surface 524 defines the first end 516. The opening 526 has a diameter 528 measured between opposing sides of the annular surface 524 though the longitudinal axis 210. The diameter 528 is generally complementary the diameter 514 of the attachment surface 508. The attachment section 520 may be coupled to the attachment surface 508. In one embodiment, the attachment section 520 is coupled the attachment surface 508 via several crimps. Other forms of coupling (i.e., chemical adhesives, stitching, etc.) are envisioned. When the filtration component 472 is coupled to the attachment component 470, the opening 526 is in open communication with the second opening 491 of the attachment component 470.

Figure 5:
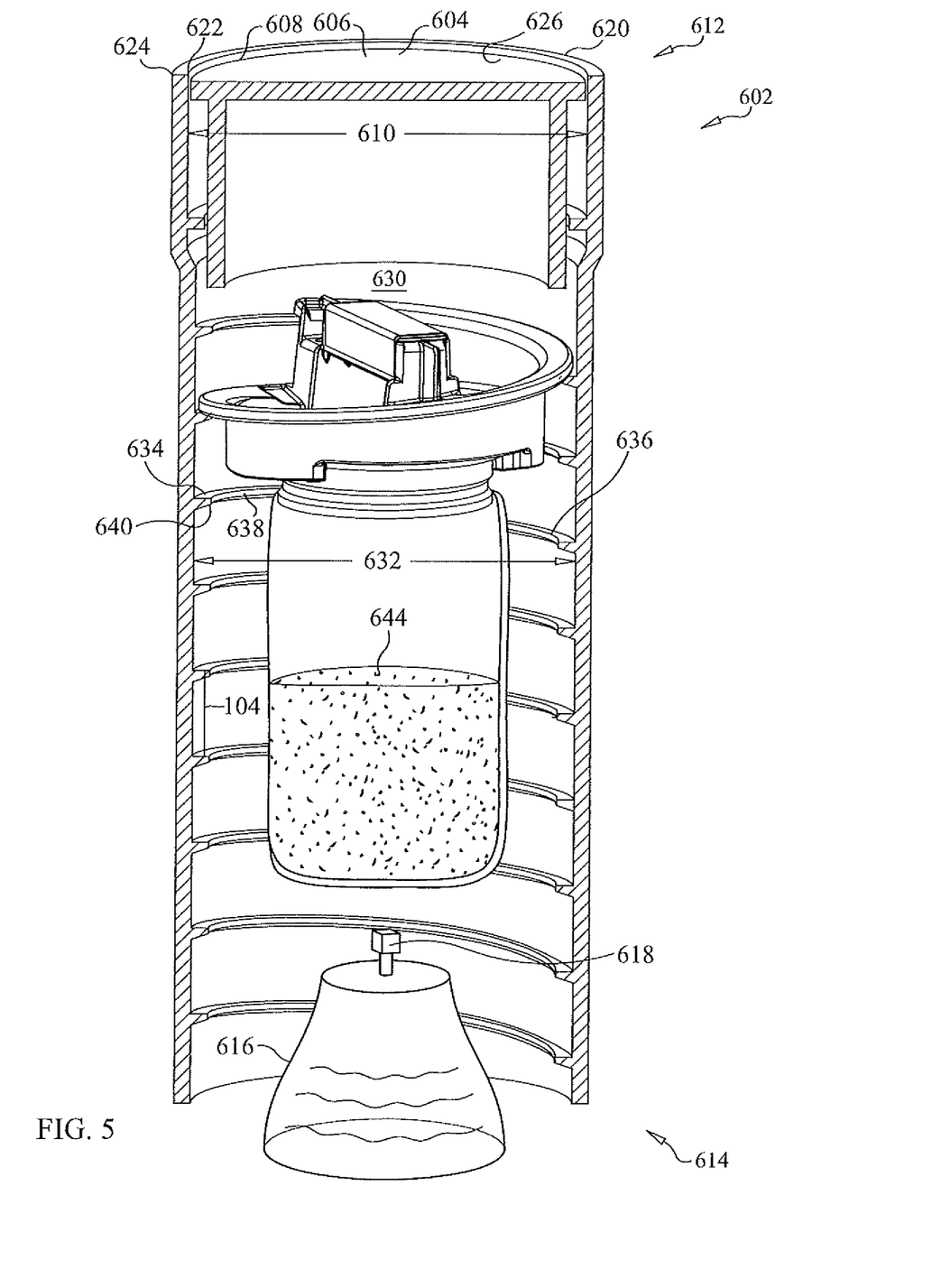
FIG. 5 is another longitudinal cross section view of the valve box with the silt and debris catching apparatus depicted in FIG. 1 taken along the line 4-4 in FIG. 1 with a pipe.

FIGS. 3-5 depict a valve box assembly 102 in operation with the silt and debris catching apparatus 100. As depicted in FIG. 5, the valve box assembly 102 includes a valve box 602 and a valve box cover 604.

A circular surface 606 of the valve box cover 604 is defined by an outer edge 608 of the circular surface 606. The circular surface 606 extends circumferentially around and are generally perpendicular to the longitudinal axis 210. The circular surface 606 has a diameter 610 measured between opposing outer edges 608 and through the longitudinal axis 210.

With continued reference to FIG. 5, the valve box 602 includes a first end 612 and a second end 614 opposite the first end 612. The longitudinal axis 210 is between the first end 612 and the second end 614. When the valve box 602 is placed in the ground, the first end 612 is generally flush with the ground surface. The second end 614 is adjacent to a pipe 616. The valve box 602 is concentric with a valve 618 that is coupled to the pipe 616. A first annular surface 620 defines the first end 612. The first annular surface 620 is defined by a first inner annular edge 622 and a first outer annular edge 624. The first annular surface 620 extends circumferentially around and generally perpendicular to the longitudinal axis 210. The first inner annular edge 622 defines a first opening 626. The first opening 626 has a diameter 628 (FIG. 4) measured through the longitudinal axis 210 and between opposing first inner annular edges 622. The diameter 628 of the first opening 626 is generally complementary to the diameter 610 of the valve box cover 604. The complementary diameters 610 and 628 of the valve box cover 604 and the valve box 602 permit the valve box cover 604 to loosely fit into the valve box 602. The loose fit permits the valve box cover 604 to be placed into and removed from the valve box 602 by hand. Furthermore, the diameter 628 is slightly larger than the diameter 214 of the housing component 202 which allows the slit and debris catching apparatus 100 to be placed within the valve box assembly 102.

The valve box 602 further comprises an inner surface 630. The inner surface 630 extends circumferentially around and generally parallel to the longitudinal axis 210. The inner surface 630 has a diameter 632 measured between opposing sides of the inner surface 630. The diameter 632 of the inner surface 630 is slightly less than the diameter 628 of the valve box 602. Furthermore, the diameter 632 is generally complementary to the diameter 214 of the housing component 202. An upper surface 634 of the thread 106 extends radially inward from the inner surface 630 to a first edge 636. A crest 638 of the thread 106 extends longitudinally from the first edge 636 to a second edge 640. The crest 638 extends circumferentially and generally parallel to the longitudinal axis 210 and the upper surface 634 extends circumferentially and generally perpendicular to the longitudinal axis 210.

Since the diameter 632 of the inner surface 630 is generally complementary to the diameter 214 of the housing component 202 and since the upper surface 634 of the thread 106 extends radially inward from the inner surface 630, when the silt and debris catching apparatus 100 is placed within the valve box assembly 102, the rounded surface 236 of the housing component 202 rests upon the upper surface 634 of the thread 106. Furthermore, since the pitch 104 of the thread 106 corresponds to the pitch 316 of the helix surface 306, the silt and debris catching apparatus 100 may be lowered into the valve box assembly 102 by rotating the silt and debris catching apparatus 100 clockwise about the longitudinal axis 210 and may be removed from the valve box assembly 102 by rotating the silt and debris catching apparatus 100 counterclockwise about the longitudinal axis 210. In one embodiment, the silt and debris catching apparatus 100 may be lowered approximately 3-5 feet below the surface within the valve box assembly 102. In this embodiment, when a surface temperature is below freezing a subsurface temperature at 3-5 feet may exceed freezing. As a result, water that enters the catchment component 204 may not freeze which allows water to pass through the catchment component 204.

The first opening 626 of the valve box assembly 102 is in open communication with the opening 462 of the housing component 202. As such material 644 (i.e., water, silt, debris, etc.) may enter the first opening 626 of the valve box assembly 102 and pass through the opening 462 of the housing component 202. Since the opening 462 of the housing component 202 is in open communication with the opening 526 of the filtration component 472, the material 644 that passes through the opening 462 of the housing component 202 may enter the filtration section 522. After the silt and debris catching apparatus 100 is removed from the valve box assembly 102, the catchment component 204 may be removed from the housing component 202. When removed, the catchment component 204 may be inverted thereby removing the material 644 from the filtration component 472.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clarity, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A material catching apparatus comprising:
   a housing component adapted to fit within a valve box assembly;
   a catchment component coupled to the housing component and adapted to retain material that enters the valve box assembly; and
   a thread follower defining a helical surface extending around and generally perpendicular to an outer wall of the housing component, the thread follower adapted to interface with a threaded interior wall of the valve box assembly.

2. The material catching apparatus of claim 1, wherein the helical surface of the thread follower further comprises:
   a pitch corresponding to a pitch of the threaded interior wall of the valve box assembly.

3. The material catching apparatus of claim 2 wherein the pitch of the helical surface is configured to permit the housing component to be screwed into the valve box assembly via interaction between the thread follower and the threaded interior wall of the valve box assembly.

4. The material catching apparatus of claim 1, wherein the catchment component further comprises:
   a direct pass-through filter adapted to retain the material entering the valve box assembly.

5. The material catching apparatus of claim 1, wherein the housing component further comprises:
   a handle integrally formed with the housing component;
   wherein the handle and the housing component are formed from a single piece of rigid polymer.

6. The material catching apparatus of claim 1, wherein the housing component further comprises:
   a bore operable to support a tracer wire passing through the silt and debris catching apparatus.

* * * * *